US009835500B2

(12) United States Patent
Nelson (10) Patent No.: US 9,835,500 B2
(45) Date of Patent: Dec. 5, 2017

(54) DEVICE FOR EMULATING TEMPERATURE OF A COMPOSITE STRUCTURE THROUGH A THERMAL CURE CYCLE (71) Applicant: The Boeing Company, Chicago, IL (US)

(72) Inventor: Karl M. Nelson, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 426 days.

(21) Appl. No.: 14/718,688

(22) Filed: May 21, 2015

(65) Prior Publication Data

US 2015/0253202 A1 Sep. 10, 2015

Related U.S. Application Data (62) Division of application No. 13/684,694, filed on Nov. 26, 2012, now Pat. No. 9,068,894.

(51) Int. Cl.
*G01K 7/02* (2006.01)
*B29C 35/02* (2006.01)

(52) U.S. Cl.
CPC .......... *G01K 7/02* (2013.01); *B29C 35/0288* (2013.01); *Y10T 29/49004* (2015.01); *Y10T 29/4935* (2015.01); *Y10T 29/49366* (2015.01)

(58) Field of Classification Search
CPC .............. G01K 7/02; Y10T 29/49004; Y10T 29/49336; Y10T 29/4935; B29C 35/0288
USPC ........ 374/179, 141, 208, 112, 166, 137, 134
See application file for complete search history.

(56) References Cited

U.S. PATENT DOCUMENTS

| 3,263,485 A | * | 8/1966 | Mahmoodi | ............ | G01N 25/18 374/112 |
| 3,531,996 A | * | 10/1970 | Harris | ................. | B29C 35/0288 374/48 |
| 4,044,600 A | | 8/1977 | Claxton et al. | | |
| 4,140,050 A | | 2/1979 | Giddings | | |
| 4,624,582 A | * | 11/1986 | Banda | ...................... | G01K 7/13 165/185 |

(Continued)

FOREIGN PATENT DOCUMENTS

CN 201583362 U 9/2010
EP 2 105 285 9/2009

OTHER PUBLICATIONS

International Preliminary Report on Patentability, PCT/US2013/063798 (dated 2015).

(Continued)

*Primary Examiner* — Jason L Vaughan
(74) *Attorney, Agent, or Firm* — Walters & Wasylyna LLC (57) ABSTRACT

A temperature emulator may include a stack assembly having a pair of end plates positioned at an uppermost and lowermost location of the stack assembly, a plurality of heat sink plates disposed between the pair of end plates, each of the heat sink plates having a plurality of heat sink cutouts, a plurality of shim plates separating adjacent pairs of the end plates and the heat sink plates, each of the shim plates having a shim cutout, an open cavity formed by a plurality of adjacent heat sink cutouts and shim cutouts, thermal insulation disposed within the cavity, and at least one temperature sensor coupled to at least one of the plurality of heat sink plates.

20 Claims, 5 Drawing Sheets

(56) References Cited

U.S. PATENT DOCUMENTS

| | | | | |
|---|---|---|---|---|
| 6,132,082 A * | 10/2000 | Pause | ............... | G01K 17/20 |
| | | | | 374/43 |
| 6,142,661 A | 11/2000 | Lafond | | |
| 6,142,662 A * | 11/2000 | Narh | ............... | G01N 25/18 |
| | | | | 374/29 |
| 6,490,501 B1 * | 12/2002 | Saunders | ............... | G05B 17/02 |
| | | | | 264/236 |
| 2003/0072349 A1 * | 4/2003 | Osone | ............... | G01N 25/18 |
| | | | | 374/43 |
| 2011/0043223 A1 * | 2/2011 | Canos | ............... | G01N 22/00 |
| | | | | 324/646 |

OTHER PUBLICATIONS

State Intellectual Property Office of PRC, First Office Action, App. No. 201380061320.1 (dated Jun. 2, 2016).

* cited by examiner

DEVICE FOR EMULATING TEMPERATURE OF A COMPOSITE STRUCTURE THROUGH A THERMAL CURE CYCLE

PRIORITY

This application is a divisional of, and claims priority from, U.S. Ser. No. 13/684,694 filed on Nov. 26, 2012, the entire contents of which are incorporated herein by reference.

FIELD

The present disclosure is generally related to composite structure production and, more particularly, to a non-contact device for emulating a temperature gradient of a composite part through a thermal cure cycle.

BACKGROUND

Autoclave processing remains vital to composite structure production. One of the primary goals of the process is to fully cure a pre-impregnated thermoset polymer matrix by initiating and sustaining specific chemical reactions that relate to final resin system cure. The curing of a composite part generally requires accurate monitoring of the temperature of the part throughout the curing process. Manufacturers typically perform a large array of preproduction tests to outline the complex change in viscoelastic properties, which occurs over time and as temperature increases, simplifying it into ramp rates, hold temperatures and dwell, or soak, durations.

In the autoclave, the part is assumed to have reached full cure when certain prescribed time and temperature goals are achieved. Therefore, safety margins must be built into the time and temperature calculations to ensure full cure, and the process must be tightly controlled. Conventional autoclave control systems are hardwired to the equipment and operated by a technician, who must monitor data readouts throughout each cure cycle.

Temperature measurements and controls are typically determined using various temperature sensors placed in or around the parts and a feedback-type algorithm. The temperature sensors, for example thermocouples, may be placed inside an excess or trim region of the part or may be placed on certain locations of the associated tooling or fixtures in close proximity to the part, in order to closely track the temperature of the part throughout the process.

Various disadvantages exist in both methods and locations of the temperature sensors. Either method requires a thermal profile to be calculated, which involves significant trial and error, in order to identify a representative location on the part, and can lead to defect and failure of the part. The thermal profile is used to characterize the part temperatures and match those temperatures at locations that naturally emulate the part temperature and does not interfere with the process or create a defect in the part. Part failure may result from failure to identify a location that adequately tracks the part temperature. Further, accurate placement of the temperature sensors in the predetermined locations and inspection of each part being fabricated is a time and labor-intensive process. Additionally, locating the temperature sensor inside the trim region of the part requires installation of a sensor for each part being cured, which may introduce defects into the parts.

SUMMARY

In one embodiment, the disclosed temperature emulator may include a stack assembly having a plurality of thermally conductive plates, an insulator layer disposed between adjacent pairs of the plurality of thermally conductive plates, and at least one temperature sensor coupled to the stack assembly.

In another embodiment, the disclosed temperature emulator may include a stack assembly having a pair of end plates positioned at an uppermost and lowermost location of the stack assembly, a plurality of heat sink plates disposed between the pair of end plates, each of the heat sink plates having a plurality of heat sink cutouts, a plurality of shim plates separating adjacent pairs of the end plates and the heat sink plates, each of the shim plates having a shim cutout, an open cavity formed by a plurality of adjacent heat sink cutouts and shim cutouts, thermal insulation disposed within the cavity, and at least one temperature sensor coupled to at least one of the plurality of heat sink plates.

In yet another embodiment, disclosed is a method of emulating a thermal inertia gradient of a composite part, the method may include the steps of: (1) providing a pair of end plates, a plurality of heat sink plates each having a plurality of heat sink cutouts, and a plurality of shim plates each having a shim cutout, (2) stack assembling the plurality of heat sink plates, wherein adjacent pairs of heat sink plates are separated by at least one of the plurality of shim plates such that a plurality of adjacent heat sink cutouts and shim cutouts form a cavity, (3) assembling the pair of end plates to form a stack assembly, (4) applying thermal insulation within the cavity, (5) creating a thermal model of the stack assembly, and (6) identifying a thermal profile of said stack assembly.

Other aspects of the disclosed temperature emulator will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The disclosed temperature emulator, generally designated 10, may be a passive device (i.e., no electronic or moving parts) that emulates the temperature from the exothermic behavior of curing materials and temperature gradient of a composite part being cured inside an autoclave or oven. The temperature emulator 10 may be referred to throughout the present disclosure generally as emulator, emulator device or device.

Generally, one or more emulators 10 may be placed into an autoclave in proximity of a corresponding part being processed (e.g., cured). The emulator 10 may not need to be in direct contact with the part. A control system for the autoclave may use an output from the emulator 10 to regulate the temperature of the part throughout a prescribed thermal cycle.

Figure 1:
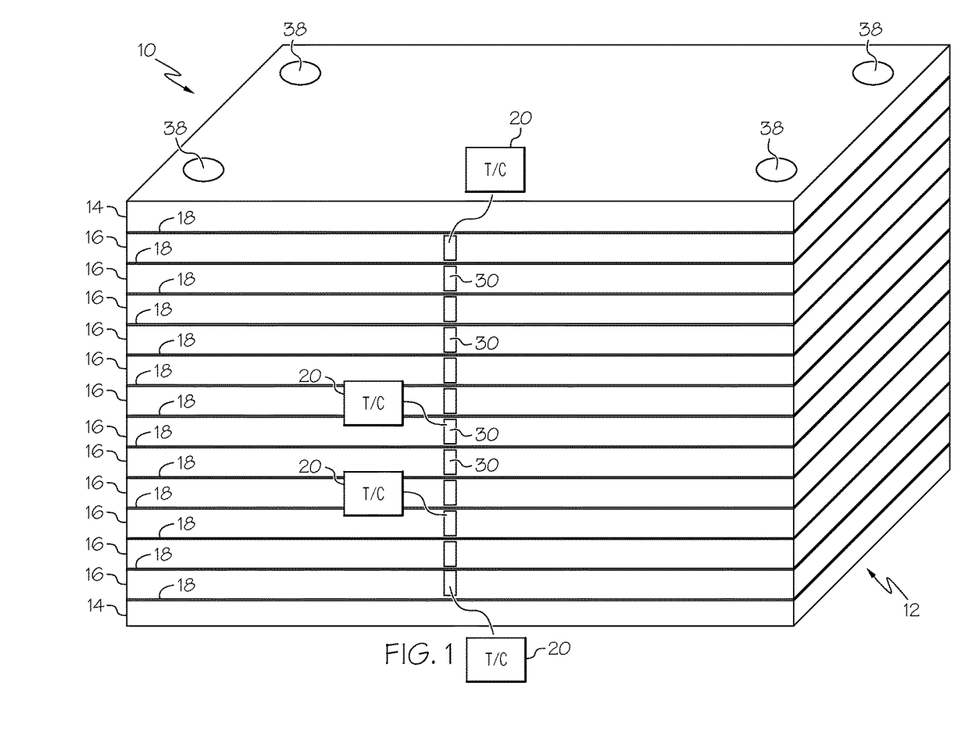
FIG. 1 is a front perspective view of one embodiment of the disclosed temperature emulator.

Referring to FIG. 1, the emulator 10 may include a stack assembly 12 having a series of stacked plates 14, 16, 18. Each plate 14, 16, 18 may be fabricated from a thermally conductive material, such as a metal (e.g., steel) or a thermally conductive non-metal. The emulator 10 may include at least two end plates 14 forming an uppermost and lowermost layer of the stack assembly 12. The emulator 10 may additionally include a plurality of heat sink plates 16 layered between the uppermost end plate 14 and the lowermost end plate 14. Adjacent pairs of plates 14, 16 may be spaced apart at a predetermined distance and separated by a shim plate 18 positioned therebetween. As will be described in more detail herein, the shim plates 18 may act as an insulator layer between adjacent pairs of end plates 14 and heat sink plates 16.

For example, as shown in FIG. 1, the uppermost end plate 14 may be spaced apart from an adjacent heat sink plate 16 by a shim plate 18. Each adjacent pair of heat sink plates 16 may also be spaced apart by a shim plate 18. The lowermost end plate 14 may also be spaced apart from an adjacent heat sink plate 16 by a shim plate 18. The thickness of the shim plate 18 may be varied to provide for a desired thermal profile of the emulator 10. For example, shim plates 18 having thicknesses of 0.010 inches, 0.060 inches and 0.0125 inches may be used to effect the desired spacing of adjacent plates 14, 16. The emulator 10 may be calibrated with the use of thermal models and by spacing the plates 14, 16 a pre-determined distance apart with the shim plates 18.

The emulator 10 may include a plurality of temperature sensors 20 coupled to one or more of the heat sink plates 16. The temperature sensors 20 may lag behind the air temperature within the autoclave by a pre-determined amount in order to match the temperature profile of the part throughout the curing process. The temperature sensors 20 may be thermocouples, thermistors, or other suitable temperature sensors. Thermal models may be used to calibrate the emulator 10 for a desired, or selected, amount of lag time or temperature. The emulator 10 may accommodate for, or replicate, multiple temperature channels, such that both the hottest (i.e., leading) temperature channel and the coldest (i.e., lagging) temperature channel of the part or multiple parts may be emulated. This may allow for relatively quick calibration of any thermal characteristics of the autoclave and tooling used in the curing process.

Figure 2:
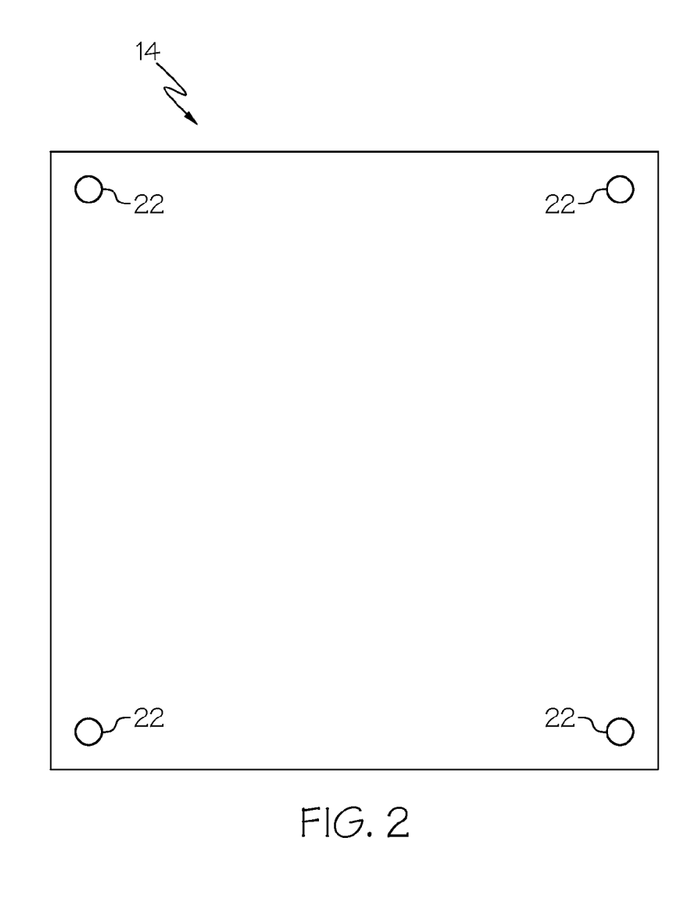
FIG. 2 is a top plan view of an end plate of the disclosed temperature emulator.

Referring to FIG. 2, each end plate 14 may be formed (e.g., cut) from a plate, such as a steel plate. The particular dimensions of the end plates 14 may vary depending on the specific temperature profile desired and type of composite laminate or ply being cured. In an example embodiment, the end plates 14 may be a 15.24 centimeters (6.0 inches) square plate having a thickness of 0.3175 centimeters (0.125 inches). It can be appreciated by one skilled in the art that the overall dimensions of the end plates 14 may vary and is not meant to be limiting in any manner. Each end plate 14 may also include a plurality of fastening apertures 22. In the illustrated embodiment, the end plate 14 may include four fastening apertures 22 located about each corner region.

Figure 3:
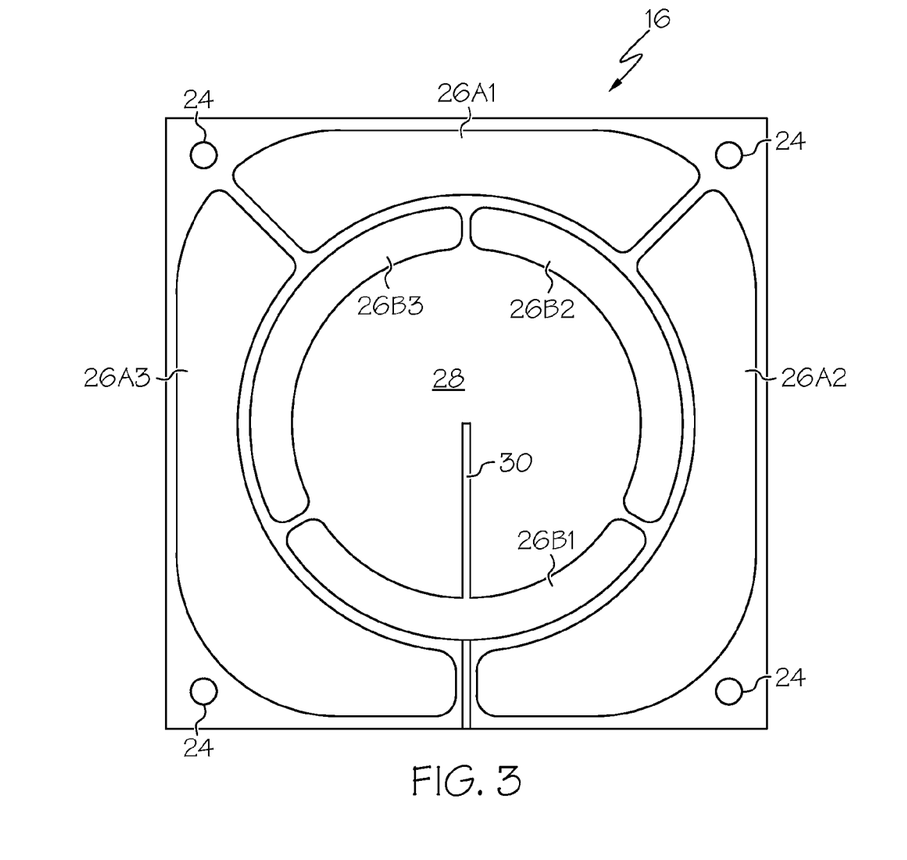
FIG. 3 is a top plan view of a heat sink plate of the disclosed temperature emulator.

Referring to FIG. 3, each heat sink plate 16 may be formed (e.g., cut) from a plate, such as a steel plate. The particular dimensions of the heat sink plates 16 may vary depending on the specific temperature profile desired and type of composite laminate or ply being cured. For example, the heat sink plates 16 may be square, rectangular, circular or oblong in plan view, and may have a substantially uniform cross-sectional thickness. In an example embodiment, the heat sink plates 16 may be a 15.24 centimeters (6.0 inches) square plate having a thickness of 0.3175 centimeters (0.125 inches), which may match the dimensions of the end plates 14. It can be appreciated by one skilled in the art that the overall dimensions of the heat sink plates 16 may vary and is not meant to be limiting in any manner. Each heat sink plate 16 may also include a plurality of fastening apertures 24. In the illustrated embodiment, the heat sink plate 16 may include four fastening apertures 24 located about each corner region.

Figure 5:
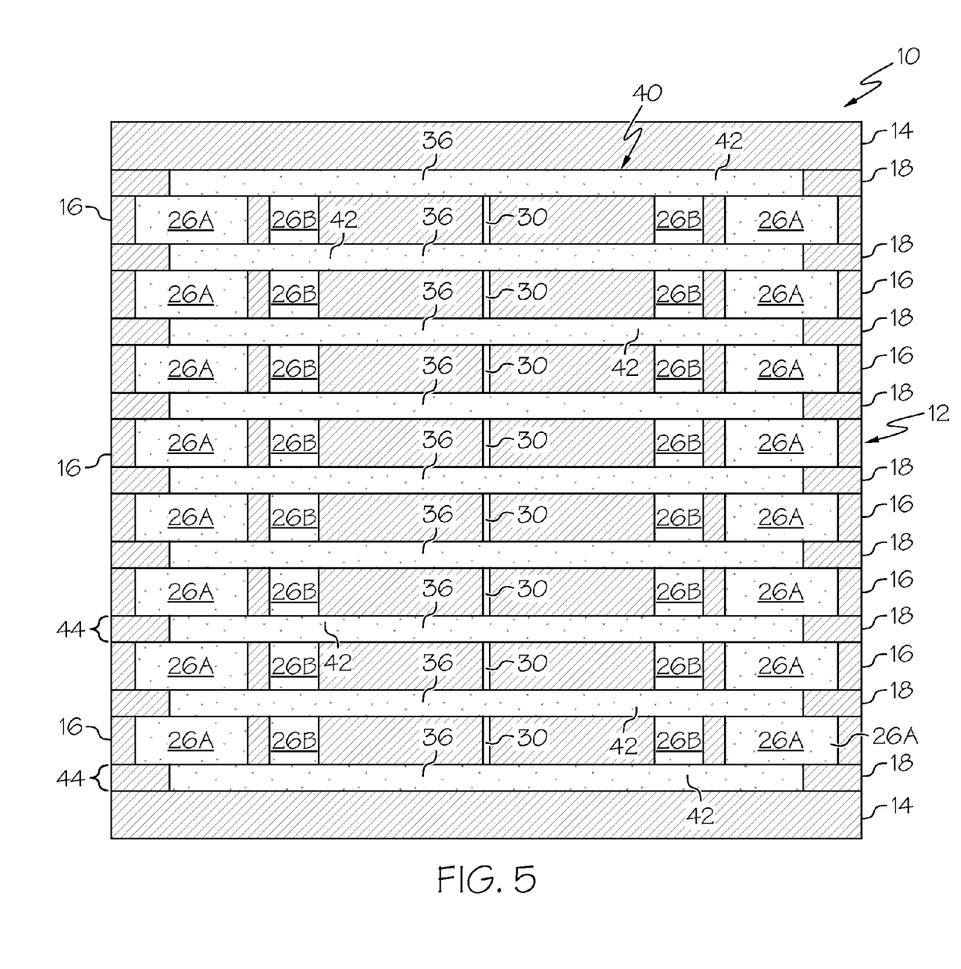
FIG. 5 is a cross-sectional view of the disclosed temperature emulator of FIG. 1.

Each heat sink plate 16 may also include a plurality of cutouts 26A1, 26A2, 26A3, 26B1, 26B2, 26B3 disposed therethrough. The cutouts 26A1, 26A2, 26A3, 26B1, 26B2, 26B3 may reduce heat transfer within the heat sink plate 16. For example, as is discussed in greater detail below, the cutouts 26A1, 26A2, 26A3, 26B1, 26B2, 26B3 may be filled with thermal insulation 42 (FIG. 5).

The cutouts 26A1, 26A2, 26A3, 26B1, 26B2, 26B3 may be formed, for example, using a water-jet cutter. In the illustrated embodiment, the heat sink plate 16 may include three generally arcuate outer cutouts 26A1, 26A2, 26A3 and three generally arcuate inner cutouts 26B1, 26B2, 26B3. One of the outer cutouts 26A1 may include a radius of approximately ninety degrees and two of the outer cutouts 26A2, 26A3 may include a radius of approximately one hundred thirty-five degrees. Each of the inner cutouts 26B1, 26B2, 26B3 may include a radius of approximately one hundred and twenty degrees. A center portion 28 of the heat sink plate 16 may be solid, and may remain within the inner cutouts 26B1, 26B2, 26B3 having an approximate diameter of 8.89 centimeters (3.5 inches).

Ends of each of the outer cutouts 26A1, 26A2, 26A3 may be spaced away from an adjacent end of an adjacent outer cutout 26A1, 26A2, 26A3 by a portion of the heat sink plate 16, for example by an approximately 0.254 centimeter (0.1 inch) section of heat sink plate 16. Inner sides of each of the outer cutouts 26A1, 26A2, 26A3 may be spaced away from an adjacent outer side of an adjacent inner cutout 26B1, 26B2, 26B3 by a portion of the heat sink plate 16, for example by an approximately 0.254 centimeter (0.1 inch) section of heat sink plate 16. Outer sides of each of the outer cutouts 26A1, 26A2, 26A3 may be spaced away from an adjacent perimeter edge of the heat sink plate 16, for example by an approximately 0.254 centimeter (0.1 inch) section of heat sink plate 16. Ends of each of the inner cutouts 26B1, 26B2, 26B3 may be spaced away from an adjacent end of an adjacent inner cutout 26B1, 26B2, 26B3 by a portion of the heat sink plate 16, for example by an approximately 0.254 centimeter (0.1 inch) section of heat sink plate 16. It can be appreciated by one skilled in the art that the overall number, shape, dimensions, and locations of the cutouts 26A1, 26A2, 26A3, 26B1, 26B2, 26B3 may vary and is not meant to be limiting in any manner.

The heat sink plate 16 may also include a channel 30 extending inwardly from a perimeter edge 32 for insertion, or otherwise coupling, of the temperature sensor 20 to the heat sink plate 16. For example, a temperature sensor 20 may be slidably inserted into an associated channel 30. In the illustrated embodiment, the channel 30 may extend to proximate a center of the center portion 28 of the heat sink plate 16 and have a thickness of approximately 0.1524 centimeter (0.06 inch). It can be appreciated by one skilled in the art that the shape, dimensions, and location of the channels 30 may vary (e.g., may depend on the shape and configuration of the temperature sensor 20) and is not meant to be limiting in any manner.

Figure 4:
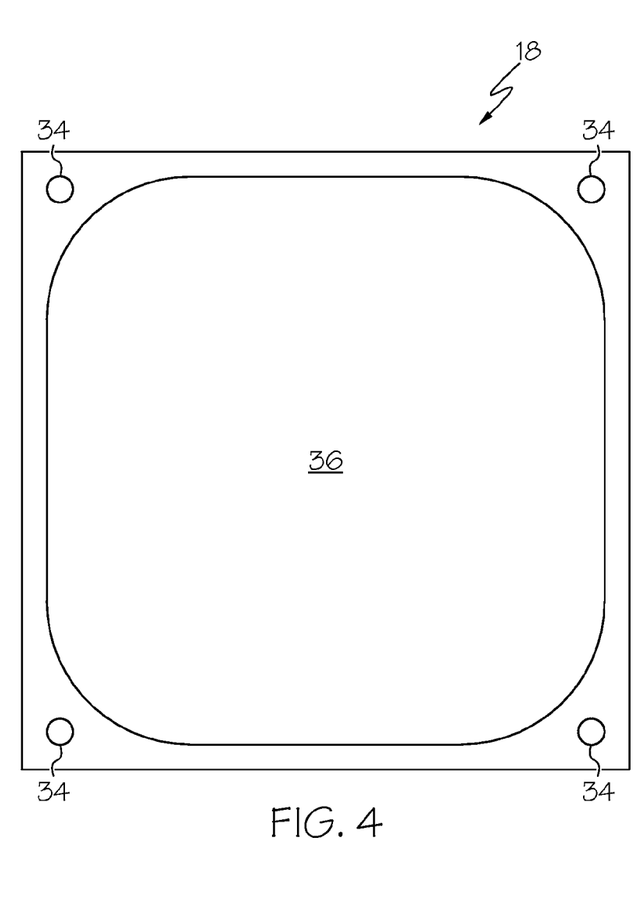
FIG. 4 is a top plan view of a shim plate of the disclosed temperature emulator.

Referring to FIG. 4, each shim plate 18 may be formed (e.g., cut) from a plate, such as a steel plate. The particular dimensions (the overall size and thickness) of the shim plates 18, as well as the size of the central cutout 36 (discussed below), may vary depending on the specific temperature profile desired and type of composite laminate or ply being cured. In an example embodiment, the shim plates 18 may be a 15.24 centimeters (6.0 inches) square plate, which may match the exterior dimensions of the end plates 14 and heat sink plates 18. The thickness of the shim plates 18 may vary depending on a specific thermal gradient desired throughout the stack assembly 12. For example, the stack assembly 12 may include a plurality of shim plates having thicknesses of 0.0254 centimeter (0.010 inch), 0.1524 centimeter (0.060 inch), and 0.3175 centimeter (0.125 inch). Each shim plate 18 may also include a plurality of fastening apertures 34. In the illustrated embodiment, the shim plate 18 may include four fastening apertures 34 located about each corner region.

Each shim plate 18 may also include a central cutout 36 disposed therethrough. The central cutout 36 may be formed, for example, using a water-jet cutter. In the illustrated embodiment, the central cutout 36 may be a (5.25 inch) square opening. It can be appreciated by one skilled in the art that the overall dimensions of the central cutout 36 may vary and is not meant to be limiting in any manner.

Referring to FIGS. 1-4, the fastening apertures 22, 24, 34 (FIGS. 2-4) may be aligned when the plates 14, 16, 18 are configured into the stack assembly 12 (FIG. 1) and may be suitably sized to receive a plurality of fasteners 38 (FIG. 1) to securely lock the stack assembly 12 together. The fastening apertures 22, 24, 34 may include a smooth bore or threaded bore formed through the plates 14, 16, 18. The fasteners 38 may be any suitable mechanical fastener, such as those having a partially or completely threaded shaft. It can be appreciated by one skilled in the art that the plates 14, 16, 18 may also be fastened together by other methods to form the stack assembly 12, including being chemically bonded, welded, or the like.

Referring to FIG. 5, stack assembly 12 of the emulator 10 may include an open cavity 40 defined by the plurality of adjacent cutouts 26A1, 26A2, 26A3, 26B1, 26B2, 26B3, 36 of the stacked combination of heat sink plates 16 and shim plates 18. Thermal insulation 42 may be provided within the cavity 40 (i.e., within the heat sink cutout 26A1, 26A2, 26A3, 26B1, 26B2, 26B3 and shim cutout 36), thus making the shim plate 18 filled with thermal insulation 42 into an insulator layer 44. The thermal insulation 42 may be any suitable thermal insulation material. In one particular construction, the thermal insulation 42 may be in the form of a powder insulation, which, due to the fluid nature of powders, may be injected into the stack assembly 12 to fill the cutouts 26A1, 26A2, 26A3, 26B1, 26B2, 26B3, 36. The powdered thermal insulation 42 may be formed of a compacted granular structure of silica-based primary particles. As a specific, non-limiting example, the thermal insulation 42 may be silica aerogel powder. The thermal insulation 42 contained within the cavity 40 may allow the emulator 10 to produce accurate and reproducible output results over many autoclave cycles.

The plates 14, 16, 18 may themselves be insulated from the surroundings on all sides but one side (i.e., the exterior surface), thus controlling the heat transfer through the stack assembly 12 in a predictable way. In effect, the thermal insulation 42 may essentially surround the center portion 28 of each heat sink plate 16, thus limiting the direction of heat transfer throughout the stack assembly 12. The alternating series of heat sink plates 16 and insulator layers 44 (i.e., layers of shim plates 18 having the shim plate cutout 36 filled with thermal insulation 42) may create a stable and well-controlled temperature gradient in a step-wise pattern, which may capture the shape of the lagging temperature sensor curve more accurately than a simple heat sink. Varying the thickness of the shim plate 18 may correspondingly vary the thickness of the insulator layer 44, as the shim plate cutout 36 may accommodate varying amounts of thermal insulation 42.

Thus, lead and lag temperatures of the emulated composite part may be replicated by calibrating the emulator 10. The emulator 10 may be calibrated by adding or subtracting heat sink plates 16 and shim plates 18 from the stack assembly 12. For example, during a first calibration, a temperature sensor 20 may be coupled to each heat sink plate 16. Following calibration, specific locations on the stack assembly 12, i.e., particular heat sink plates 18, may be chosen for the coupling of temperature sensors 20. Thermal modeling or other analysis may be used to determine a particular configuration of the stack assembly 12 after the thermal profile has been identified, such that the emulator 10 may emulate or replicate the thermal inertia gradient of heating of a corresponding composite lamina part independent of part specific thermal monitoring throughout the thermal cycle of the curing process.

Figure 6:
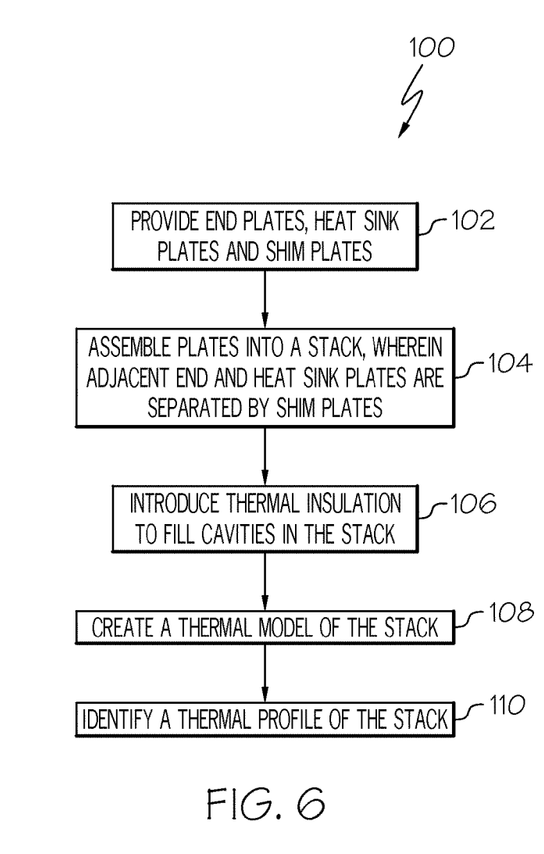
FIG. 6 is a flow chart depicting one embodiment of the disclosed method of emulating a thermal inertia gradient of a composite part.

Referring to FIG. 6, also disclosed is a method 100 of emulating a thermal inertia gradient of a composite part. The method 100 may begin at Block 102 with the step of providing end plates, heat sink plates and shim plates. At Block 104, the end plates, the heat sink plates and the shim plates may be assembled into a stack assembly. The stack assembly may define one or more open cavities. At Block 106, thermal insulation may to introduced to the stack assembly to fill (at least partially) the open cavities. At Block 108, a thermal model of the stack assembly may be created. At Block 110, a thermal profile of the stack assembly may be identified.

Thus, the thermal profile of the stack assembly may be compared to the thermal profile of a composite part. The user may then determine a configuration of the stack assembly that has a thermal profile that closely matches the thermal profile of the composite part. Shim plates and/or heat sink plates may be added to, or subtracted from, the stack assembly based on the determined configuration.

A temperature sensor may be thermally coupled to at least one of the heat sink plates of the stack assembly. For example, the temperature sensor may be inserted into a channel 30 in one of the heat sink plates. Then, the stack assembly may be positioned in an autoclave in proximity to at least one composite part having a matching thermal profile. Therefore, a thermal inertia gradient of the stack assembly may be monitored (i.e., the step of monitoring a thermal inertia gradient may be performed). The control settings of the autoclave may be adjusted in response to the thermal inertia gradient of the stack assembly throughout a thermal cure cycle.

In another application, the disclosed emulator may be used to emulate an exotherm event.

Although various aspects of the disclosed temperature emulator have been shown and described, modifications may occur to those skilled in the art upon reading the specification. The present application includes such modifications and is limited only by the scope of the claims.

What is claimed is:

1. A method of emulating a thermal inertia gradient of a composite part, said method comprising:
   providing a pair of end plates, a plurality of heat sink plates each comprising a plurality of heat sink cutouts, and a plurality of shim plates each comprising a shim cutout;
   stack assembling said plurality of heat sink plates, wherein adjacent pairs of heat sink plates are separated by at least one of said plurality of shim plates such that a plurality of adjacent heat sink cutouts and shim cutouts form a cavity;
   assembling said pair of end plates to form a stack assembly;
   applying thermal insulation within said cavity;
   creating a thermal model of said stack assembly; and
   identifying a thermal profile of said stack assembly.

2. The method of claim 1 further comprising:
   identifying a thermal profile of said composite part; and
   comparing said thermal profile of said stack assembly to said thermal profile of said composite part.

3. The method of claim 2 further comprising:
   determining a configuration of said stack assembly having a thermal profile matching said thermal profile of said composite part; and
   adding shim plates to or subtracting shim plates from said stack assembly based on said configuration.

4. The method of claim 2 further comprising:
   determining a configuration of said stack assembly having a thermal profile matching said thermal profile of said composite part; and
   adding heat sink plates to or subtracting heat sink plates from said stack assembly based on said configuration.

5. The method of claim 2 further comprising:
   determining a configuration of said stack assembly having a thermal profile matching said thermal profile of said composite part;
   adding shim plates to or subtracting shim plates from said stack assembly based on said configuration; and
   adding heat sink plates to or subtracting heat sink plates from said stack assembly based on said configuration.

6. The method of claim 1 further comprising:
   coupling at least one temperature sensor to at least one of said heat sink plates;
   positioning said stack assembly with at least one temperature sensor in an autoclave in proximity to at least one composite part having a matching thermal profile; and,
   monitoring a thermal inertia gradient of said stack assembly.

7. The method of claim 1 further comprising coupling at least one temperature sensor to at least one of said heat sink plates.

8. The method of claim 7 further comprising positioning said stack assembly with at least one temperature sensor in an autoclave in proximity to at least one composite part having a matching thermal profile.

9. The method of claim 8 further comprising monitoring a thermal inertia gradient of said stack assembly.

10. The method of claim 9 further comprising the step of adjusting control settings of an autoclave in response to said thermal inertia gradient of said stack assembly throughout a thermal cure cycle.

11. The method of claim 7 wherein each heat sink plate of said plurality of heat sink plates further comprises a center portion.

12. The method of claim 11 wherein said temperature sensor is coupled to said center portion.

13. The method of claim 11 wherein each heat sink plate of said plurality of heat sink plates comprises a channel extending from a perimeter edge to proximate a center of said center portion to receive said temperature sensor.

14. The method of claim 7 wherein said temperature sensor comprises a thermocouple.

15. The method of claim 1 wherein said thermal insulation comprises a powder.

16. The method of claim 1 wherein said thermal insulation comprises silica aerogel powder.

17. The method of claim 1 wherein said plurality of heat sink cutouts comprises a plurality of generally arcuate outer cutouts and a plurality of generally arcuate inner cutouts spaced apart from said outer cutouts.

18. The method of claim 1 further comprising securing together said stack assembly using a plurality of fasteners.

19. The method of claim 1 wherein a first shim plate of said plurality of shim plates has a first thickness and a second shim plate of said plurality of shim plates has a second thickness, said first thickness being different from said second thickness.

20. The method of claim 1 wherein each shim plate of said plurality of shim plates has a thickness ranging from about 0.010 inch to about 0.125 inch.

* * * * *